Patented Feb. 12, 1946

2,394,564

UNITED STATES PATENT OFFICE 2,394,564

SULPHURIZED PHENOLIC COMPOSITION

Orland M. Reiff and John D. Zech, Woodbury, N. J., assignors to Socony-Vacuum Oil Company, Incorporated, a corporation of New York No Drawing. Application August 12, 1942, Serial No. 454,570

5 Claims. (Cl. 260—3)

This invention relates to synthetic compositions of matter having rubber-like properties and is specifically concerned with vulcanization of certain alkylated aromatic bodies to form such synthetic compositions.

The alkylated aromatic material to be treated is composed of aromatic nuclei which are predominantly at least di-substituted by predominantly straight-chain alkyl groups, such as are obtained from petroluem wax. These basic substances may be advantageously prepared by a Friedel-Crafts reaction between aromatic material and a chlorinated petroleum wax of at least 25% chlorine content in a ratio of at least two mols of combined chlorine per mol of aromatic material, preferably at least 3 to 1. These materials are themselves of a rubber-like nature, as described in co-pending application Serial No. 427,588, filed January 21, 1942, by Orland M. Reiff and John J. Giamarria. Before vulcanization, the basic materials of that application will soften and become tacky when heated. In this state, they will flow under light pressure. In these respects the materials of the said application are similar to unvulcanized rubber. We have now found that the said basic materials may be vulcanized by processes known for the treatment of natural rubber; whereby the above disadvantages are overcome and the tensile strength, resistance to solvents, and other properties are greatly improved.

As formed in a Friedel-Crafts synthesis, the alkyl side chains of the basic material may include some double bonds. Preferably, the basic material is further treated to increase the number of double bonds, as by the process of our copending application Serial No. 432,278, filed February 25, 1942. This is accomplished by dehalogenation of a wax aromatic compound having halogen substituents on the side chains.

Although products of this type generally contain some chlorine because of incomplete reaction, the amount of chlorine remaining will usually not exceed about two per cent by weight. In order to form a wax aromatic compound, particularly of the wax phenol type, completely free of chlorine, it is necessary to run a prolonged reaction which results in some cracking of the substituted wax groups and the formation of a product of lower viscosity and of less desirable characteristics.

To prepare the intermediate of the present invention, a higher amount of halogen is intentionally allowed to remain in the Friedel-Crafts reaction product or introduced thereafter by halogenating the wax aromatic compound, followed by dehalogenating the product, after decomposition or removal of the AlCl₃ catalyst, or other metal halide catalyst, by heating in the presence or absence of dehalogenating agents. By this dehalogenating procedure, an improved composition for the present purpose is obtained. The product has itself higher tensile strength as a rubber-like composition and greater toughness and durability as a hard plastic material, and is more valuable for the preparation of vulcanizates.

PREPARATION OF PLASTIC AND RUBBER-LIKE COMPOSITIONS

In the following examples, procedures will be given for the formation of the halogen-containing wax aromatic compounds as division (a); and the dehalogenation step will be outlined as part (b).

(a) *Halogen-containing wax aromatic compounds.*—A rubber-like composition comprising a chlorine-containing wax phenol, prepared as outlined below, by tri-substitution of phenol with wax of 27% chlorine content, will have a phenol content of about 25%, a chlorine content of about 5%, the remainder of the molecule consisting of combined wax. The compositions may be represented by the following general formula which is not an attempt to give, however, an exact representation of the molecule. For simplicity, the different aromatic nuclei are represented by the phenyl radical.

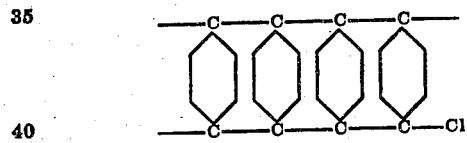

The compositions are represented in the foregoing formula with a single attachment of the aromatic group to each wax group, but in the reaction of chlorwax of high chlorine content with aromatic compounds as carried out in the preparation of plastic and rubber-like intermediates, apparently the aromatic group will be attached in some cases to more than one carbon of the same wax group, particularly in reactions with aromatic compounds of the condensed nuclei and polycyclic type.

Some chain formation would be expected to occur in the reaction of aromatic compounds with chlorinated waxes, in which case the following representation would be applicable, → representing a continuation of the chain structure:

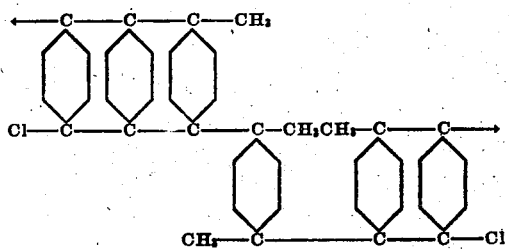

The halogen is represented in the foregoing formulae as an end carbon substituent, but the position of the halogen group is undeterminable, except that it is substituted in the aliphatic group. The compositions are represented as dialkyl-substituted aromatic compounds, but an amount of chlorwax can be reacted which is sufficient to substitute all the replaceable hydrogen of the aromatic nuclei. Generally, an amount of chlorwax sufficient to at least tri-substitute the aromatic compound is favored. Chlorinated wax of 50% chlorine content can be prepared conveniently. This degree of chlorination of the wax can be used in formation of the plastic and rubber-like compositions, but will require the use of a powerful mixer because of the high viscosity of the mixture obtained. A tough, rubber-like product results during the formation of the wax phenol described below, containing 5% chlorine, which can be carried out in ordinary laboratory reactors of glass.

EXAMPLE I

*Preparation of wax phenol containing chlorine*

Reaction mixture: Grams
  Phenol _____ 48
  Chlorinated wax of 27% chlorine content _____ 200
  AlCl₃ (anhy.) _____ 3

Paraffin wax of ASTM melting point of about 126° F. and of average molecular weight of about 350 is melted and a current of chlorine is introduced at a temperature of about 250° F. until 27% by weight of chlorine is absorbed. The phenol is then added, followed by addition of the anhydrous AlCl₃ at a temperature of about 190° F. with rapid stirring. The temperature of the mixture is gradually raised to about 350° F. during a one-hour period with efficient stirring to reduce foaming caused by evolution of HCl. The reaction mixture is then held at this temperautre about one hour to bring about sufficient reaction.

It has been discovered that the reaction product, upon becoming highly viscous and difficult to stir, will break up into fine particles if allowed to stand with the temperature maintained at the point of high viscosity development. Hence, it is desirable to discontinue stirring at the point of high viscosity, followed by renewed stirring at the point where break up of the material occurs. High viscosity development in the formation of the present wax phenol occurs at about 325° F.

The reaction mixture is then cooled and contacted with water to decompose the aluminum chloride reaction product, whereby the aluminum chloride can be removed from the mixture. To ensure complete removal of any corrosive halogen, the product is digested with dilute (1%) caustic soda by refluxing the mixture several hours, followed by removing the alkaline solution and water-washing or neutralizing with dilute hydrochloric or acetic acid. Aqueous ammonia can also be used in the removal of corrosive halogen, which is advantageous because of the readiness with which the ammonia can be removed after the digesting operation. In this state, the product can be formed into a sheet by running through squeeze rolls and further washing with water in this rolling operation. The rubber-like composition can be readily dried on a heated mill roll or can be cut into sheets and laid aside to dry.

In the foregoing procedure, the chlorine content of the finished product is controlled by the amount of AlCl₃ used as catalyst in the Friedel-Crafts reaction. As an alternative procedure, the chlorwax and phenol can be reacted in the presence of sufficient AlCl₃ to substantially eliminate the chlorine as HCl, followed by cooling the mixture, diluting with ethylene dichloride and introducing chlorine until the desired amount of halogen is absorbed. The reaction product is then purified as outlined above. This procedure is only applicable where the wax phenol is soluble in organic solvents, as for example, a diwax phenol prepared from wax of 27% chlorine content.

(b) *Dehalogenation of halogen-containing wax aromatic compounds.*—Chlorine-containing wax phenol, prepared as outlined in the foregoing, can be dehalogenated thermally or by heating in the presence of agents such as aqueous caustic soda; ammonia or amines; alkali cyanides, cyanates or thio-cyanates. Contact clays and silica gel are excellent dehalogenating agents, but their removal from the plastic and rubber-like compositions is difficult. When the dehalogenation is carried out in the presence of caustic soda, some hydroxylation takes place; in the presence of ammonia or amines, amino groups are introduced; in the presence of alkali cyanides, cyanates, or thio-cyanates, cyano, cyanate and thio-cyanate groups, respectively, are introduced. Any method of dehalogenation, however, results in the formation of unsaturated products. Dehalogenation in the presence of dilute caustic soda for the purpose of neutralizing HCl in the preferred procedure.

*Dehalogenation of wax phenol containing 4% chlorine*

Reaction mixture:
  Wax phenol (prepared as in (a) above) _____g__ 260
  3% Caustic soda solution_____cc__ 700

PROCEDURE

The chlorine-containing wax phenol from the Friedel-Crafts reactor is agitated with the dilute caustic soda solution at a temperature of about 500° F. for a period of about 2 to 4 hours. In the dehalogenation, the product is broken up into small particles which can be readily purified by water-washing. The general procedure consists in removing the caustic solution by water-washing alone or by neutralizing with dilute hydrochloric or acetic acid. When hydrochloric acid is used as the neutralizing agent, it is customary to make the mixture slightly alkaline with ammonia to ensure complete neutralization of any corrosive HCl. The product is then further washed with water and milled into sheets by the procedure outlined above in the purification of the chlorine-containing wax aromatic compounds.

A rubber-like composition derived from the foregoing chlorine-containing wax phenol of Example I by dehalogenating, will have a combined phenol content of about 25% and approximately 75% of combined wax. A small amount of halogen will remain because of incomplete dehalogenation. A minor amount of hydroxylation will be obtained since caustic soda is used as the dehalogenating agent.

The above-described aromatics substituted by side chains of enhanced unsaturation are the preferred intermediates utilized in practicing the present invention. Regardless of whether this additional unsaturation of the side chains is accomplished, the intermediate is subjected to heat in admixture with sulphur in a step which is in every sense similar to sulphur vulcanization of natural rubber and will be referred to as "vulcanization" herein. For simplicity, the substituted aromatics will be numerically designated by numerals in parentheses following the name of the aromatic, the first number indicating degree of substitution and the second the percentage chlorine content of the chlorwax used in a Friedel-Crafts reaction to cause alkylation. Thus, "wax phenol (3–27" is phenol which has been reacted with 27% chlorwax in proportion to tri-alkylate the phenol, i. e., one mol of phenol to three mols of combined chlorine.

By means of sulphur vulcanization, natural rubber is improved in respect to its physical properties such as elasticity and tensile strength and is made more inert to the action of various organic solvents. Similarly, the wax-substituted aromatic compounds can be improved to make them more applicable to a wide variety of commercial uses. The various compounding agents and accelerators used in the vulcanization of rubber are applicable to the wax-substituted compounds, although the mechanisms of the vulcanization may differ. While the vulcanization of rubber consists in the formation of high molecular weight compounds by linking the aliphatic groups by the attachment of sulphur at the double bonds, the vulcanization of wax-substituted aromatic compounds would be attained by forming polymeric chains through the attachment of sulphur at the aryl nuclei as well as at the double bonds of the wax substituents. Considering that it is possible to fully substitute the carbons of the aromatic nucleus by reaction with the theoretical amount of chlorwax or unsaturated wax, it should be possible to force the vulcanization to take place by the attachment of sulphur at the double bonds of the wax groups without forming aryl sulphide linkages, in which case the mechanism of the vulcanization would be analogous to the vulcanization of rubber.

It has been found that wax phenol compositions formed by the reaction of phenol with sufficient chlorwax to fully substitute the aromatic nucleus and allowing some unreacted halogen to remain, followed by partial or complete dehalogenation by digestion with dilute caustic soda to form unsaturated wax groups, can be vulcanized to give products of greater elasticity than those formed from wax phenols which are not fully substituted by reaction with chlorwax. This comparison is illustrated in Examples I and II of the following methods for the vulcanization of unsaturated wax phenols (3–27) and (5–27). These examples indicate that the chaining of wax-substituted aromatic compounds by means of aryl sulphide linkages results in the formation of products of a more resinous nature. The (3–27) wax phenol vulcanizate is harder than the (5–27) wax phenol product and has a greater tendency to stiffen at lower temperatures. When stretched, the (5–27) product retracts faster, but both products are perfectly elastic and return to their original state when the tension is released.

In the case of unsaturated wax phenol (3–27) represented in Example I, vulcanization would be expected to take place through the formation of both aryl sulphide and alkyl sulphide linkages. The vulcanization of a wax phenol formed without appreciable unsaturation introduced in the wax substituents, would be accomplished largely by aryl sulphide linkages. Because of the difficulty of completely eliminating halogen in the Friedel-Crafts reaction, the wax substituents would be expected to be unsaturated to some degree when the wax phenol composition is digested with caustic soda after the Friedel-Crafts reaction and the following vulcanization with sulphur would be expected to always result to some degree in the formation of alkyl sulphide linkages.

It has been explained in the foregoing that sulphur can be introduced in both the aryl nucleus and the aliphatic substituents when wax-substituted aromatic compounds are vulcanized with sulphur by methods currently used in the vulcanization of natural rubber. Aryl sulphide groups can also be introduced in the reaction by reacting chlorwax with aromatic compounds, followed by reaction with sulphur or sulphur chlorides. Alkyl sulphide groups along with double bonds are introduced when chlorine-containing wax-substituted aromatic compounds formed by chlorinating wax aromatic compounds or allowing unreacted chlorine to remain after the Friedel-Crafts reaction are dehalogenated by reaction with alkali sulphides or hydro-sulphides. The introduction of sulphur by these methods may be considered as a form of vulcanization, but further vulcanization of such compositions containing aryl sulphide or alkyl sulphide groups by reaction with sulphur in the presence of accelerators used in the vulcanization of rubber is contemplated.

Wax-substituted aromatic compounds containing other substituents are also contemplated in the invention. In the reaction of hydroxyaromatic compounds such as phenol and the naphthols with chlorwax, the hydroxyl group is present in the finished product as an aryl substituent. Aromatic compounds, such as cresol, diphenyl oxide and chlor-phenol can be reacted with chlorwax to form wax-substituted compounds containing low molecular weight aliphatic groups, aroxy groups and chlorine radicals respectively, as aryl substituents. Unsaturated aliphatic groups can be introduced by reacting di-olefins, such as butadiene, or unsaturated alkyl halides such as allyl chloride, with the aromatic compound, before, during, or after the reaction with chlorwax. Other aryl groups can be introduced after the aromatic compound is reacted with the chlorwax. For example, phenol can be reacted with chlorwax in the presence of AlCl₃ as catalyst, followed by reaction with organic acid anhydrides or acid chlorides to form ester groups which can be re-arranged by the Fries reaction to form keto substituents; by reaction with unsaturated acid chlorides such as crotonyl chloride, unsaturated ester and keto groups can be introduced. Chlorine-containing wax-substituted compounds with the halogen in the wax groups, can be digested with aqueous solutions of various reagents, as outlined in the foregoing, to introduce substituents in place of aliphatic halogen.

It has been pointed out in the foregoing that vulcanization of the wax-substituted aromatic compounds results in the formation of products of improved tensile strength. By incorporating fillers, particularly carbon black, the improvement in tensile strength is much greater and the resistance to tear and wear is improved. The improvement obtained by incorporating various fillers appears to be directly in line with the improvement obtained by the same fillers when incorporated with rubber.

The incorporation of the vulcanizing agents and fillers with the wax-substituted aromatic compounds was accomplished by use of a compounding mill by methods recommended in the compounding of natural rubber. The compounding mixtures investigated were those used in the formation of soft rubbers. The compounded materials were rolled into a sheet about ⅛ inch in thickness and heated in a vulcanizer of the type described in ASTM Standards on Rubber Products, December, 1940 Edition, page 111, at a temperature of about 140°–150° C. during a period of about 40 minutes to 3 hours at variable pressures.

The following compounding mixtures were found to be effective in the formation of vulcanized, elastic compositions:

EXAMPLE II

Unsaturated, wax-substituted phenol (3–27)
| | |
|---|---|
| grams | 300 |
| Carbon black do | 120 |
| Stearic acid do | 12 |
| Zinc oxide do | 15 |
| Sulphur do | 9 |
| Mercaptobenzothiazole do | 3 |
| Vulcanization time at 149° C hour | 1 |

EXAMPLE III

Unsaturated, wax-substituted phenol (5–27)
| | |
|---|---|
| grams | 300 |
| Carbon black do | 120 |
| Stearic acid do | 12 |
| Zinc oxide do | 15 |
| Sulphur do | 9 |
| Mercaptobenzothiazole do | 3 |
| Vulcanization time at 149° C minutes | 45 |

EXAMPLE IV

Unsaturated, wax-substituted phenol (3–27)
| | |
|---|---|
| grams | 300 |
| Stearic acid do | 12 |
| Zinc oxide do | 15 |
| Sulphur do | 9 |
| Mercaptobenzothiazole do | 3 |
| Vulcanization time at 149° C minutes | 45 |

VULCANIZATION OF WAX-SUBSTITUTED AROMATIC COMPOUNDS BLENDED WITH NATURAL RUBBER

Inasmuch as the wax-substituted aromatic compounds of rubber-like character can be vulcanized by use of the compounding mixtures and methods used in the vulcanization of rubber, blends were made of rubber and representative wax-substituted aromatic compounds and vulcanizates were made thereof.

It was found that natural rubber could be plasticized more readily on the compounding mill when admixed with unsaturated wax phenol (3–27) and (5–27), which facilitated the incorporation of the compounding ingredients. The natural rubber and wax phenol composition could be blended in all proportions. The compounding was carried out by first milling the wax phenol composition until it was plastic, followed by adding the natural rubber. Carbon black and stearic acid were then milled into the mixture followed by incorporating zinc oxide, sulphur and the accelerator in the proportions given in the following examples. The blending was also done by compounding the rubber and wax phenol compositions separately, followed by mixing the compounded products.

EXAMPLE V

Unsaturated wax-substituted phenol (3–27)
| | |
|---|---|
| grams | 75 |
| Natural rubber do | 225 |
| Carbon black do | 120 |
| Stearic acid do | 12 |
| Zinc oxide do | 15 |
| Sulphur do | 9 |
| Mercaptobenzothiazole do | 3 |
| Vulcanization time at 140° C minutes | 40 |

EXAMPLE VI

Unsaturated wax-substituted phenol (5–27)
| | |
|---|---|
| grams | 75 |
| Natural rubber do | 225 |
| Carbon black do | 120 |
| Stearic acid do | 12 |
| Zinc oxide do | 15 |
| Sulphur do | 9 |
| Mercaptobenzothiazole do | 3 |
| Vulcanization time at 140° C minutes | 40 |

The wax phenol composition (5–27), of Example V, was found to give better plasticizing action than wax phenol (3–27) of Example IV, which is due apparently to the softer nature of the (5–27) product.

The vulcanizate of Example V was more flexible and elastic than that of Example IV. The change in physical properties of rubber vulcanizates which can be obtained by incorporating certain wax-substituted aromatic compounds in the compounding mixture is a valuable characteristic, which can be utilized in meeting special requirements such as flexibility and hardness in the manufacture of rubber goods.

RECLAIMING OF USED, VULCANIZED RUBBER IN COMBINATION WITH WAX-SUBSTITUTED AROMATIC COMPOUNDS

Wax-substituted aromatic compounds can also be incorporated with rubber in the process of reclaiming used rubber vulcanizates by digestion with dilute caustic soda. The procedure consists in reclaiming rubber along with the purification and dehalogenation of the Friedel-Crafts reaction mixture obtained by reacting chlorwax with aromatic compounds. The wax-substituted aromatic compounds facilitate the reclaiming operation by their plasticizing action. By incorporating soft, flexible wax-substituted compounds such as wax phenol (5–27), the vulcanizates derived therefrom will be more flexible. The reclaiming process is illustrated by the following example:

EXAMPLE VII

The rubber vulcanizate was cut and ground into small pieces and introduced along with an equal weight of wax phenol (5–27) into an autoclave. About 2 parts of a 2% solution of sodium hydroxide in water were then added and the mixture was heated at 500° F. with stirring for about 2 hours. The caustic soda solution was then removed by filtering the mixture and the rubber-wax phenol composition was washed with water on a rubber mill, followed by drying the mixture by heating on rolls to give a homogeneous, plastic material. Compounding agents were then incorporated in the following proportion, followed by heating in the vulcanizing mold at 142° C. to give a flexible vulcanizate:

| Wax phenol reclaimed rubber mixture | grams | 300 |
|---|---|---|
| Carbon black | do | 120 |
| Stearic acid | do | 12 |
| Zinc oxide | do | 15 |
| Sulphur | do | 9 |
| Mercaptobenzothiazole | do | 3 |
| Vulcanization time at 137° C | hour | 1 |

The invention may be regarded as vulcanization (that term being used with the meaning understood in the rubber industry) of a substance represented by the formula $A_xW_y$ wherein A designates aryl nuclei, W represents unsaturated side chains on said nuclei, $x$ is a whole number and $y$ is a whole number at least twice as great as $x$, the said side chains being predominantly straight-chain aliphatic groups of at least 20 carbon atoms or aliphatic groups derived from petroleum wax, which designates substituents of the type previously defined.

While compounding agents are listed in the foregoing examples that are capable of effecting a degree of vulcanization of the wax aromatic compounds, it has been found that the degree and rate of vulcanization can be increased by the use of organic compounds of nitrogen such as the following: diphenylguanidine, diorthotolylguanidine, hexamethylenetetramine and ammonia or amine reaction products of aldehydes in general. About 1 part of the nitrogen compound per 100 parts of wax-substituted aromatic compound has been found to give improved vulcanization.

We claim:

1. A composition of matter formed by heating chlorinated petroleum wax of at least about 25% chlorine content with a phenol having at least two nuclear carbon atoms capable of substitution in the presence of a Friedel-Crafts catalyst and in a mol ratio of combined chlorine to said phenol not less than two, to produce a complex condensation product containing chlorine, dechlorinating said product to cause unsaturation of aliphatic groups and thereafter heating said condensation product with sulphur to vulcanize the same.

2. A composition of matter formed by heating chlorinated petroleum wax of at least about 25% chlorine content with a phenol having at least two nuclear carbon atoms capable of substitution in the presence of a Friedel-Crafts catalyst and in a mol ratio of combined chlorine to said phenol not less than two to produce a complex condensation product containing chlorine, dechlorinating said product by heating with aqueous caustic to cause unsaturation of aliphatic groups and thereafter heating said condensation product with sulphur to vulcanize the same.

3. A composition of matter formed by heating chlorinated petroleum wax of at least about 25% chlorine content with a phenol having at least two nuclear carbon atoms capable of substitution in the presence of a Friedel-Crafts catalyst and in a mol ratio of combined chlorine to said phenol of not less than two, to produce a complex condensation product containing chlorine, dechlorinating said product to cause unsaturation of aliphatic groups and thereafter heating said condensation product with sulphur to vulcanize the same in the presence of natural rubber.

4. A composition of matter formed by heating chlorinated petroleum wax of at least about 25% chlorine content with a phenol having at least two nuclear carbon atoms capable of substitution in the presence of a Friedel-Crafts catalyst and in a mol ratio of combined chlorine to said phenol of not less than two, to produce a complex condensation product containing chlorine, dechlorinating said product to cause unsaturation of aliphatic groups and thereafter heating said condensation product with sulphur to vulcanize the same in the presence of a filler.

5. A composition of matter formed by heating chlorinated petroleum wax of at least about 25% chlorine content with a phenol having at least two nuclear carbon atoms capable of substitution in the presence of a Friedel-Crafts catalyst and in a mol ratio of combined chlorine to said phenol of not less than two, to produce a complex condensation product containing chlorine, dechlorinating said product to cause unsaturation of aliphatic groups and thereafter heating said condensation product with sulphur to vulcanize the same in the presence of carbon black.

ORLAND M. REIFF.
JOHN D. ZECH.